(12) United States Patent
Yu et al.

(10) Patent No.: US 12,077,657 B2
(45) Date of Patent: Sep. 3, 2024

(54) OLEFIN MULTI-BLOCK COPOLYMER / SILICONE RUBBER COMPOSITIONS AND FOAMS FORMED FROM THE SAME

(71) Applicant: Dow Global Technologies LLC, Midland, MI (US)

(72) Inventors: Haiyang Yu, Shanghai (CN); Xiaolian Hu, Shanghai (CN); Hongyu Chen, Shanghai (CN); Kyle G. Kummer, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 350 days.

(21) Appl. No.: 16/958,727

(22) PCT Filed: Dec. 28, 2017

(86) PCT No.: PCT/CN2017/119247
§ 371 (c)(1),
(2) Date: Jun. 28, 2020

(87) PCT Pub. No.: WO2019/127182
PCT Pub. Date: Jul. 4, 2019

(65) Prior Publication Data
US 2020/0332093 A1     Oct. 22, 2020

(51) Int. Cl.
*C08L 23/00*     (2006.01)
*C08J 9/00*     (2006.01)

(52) U.S. Cl.
CPC ............. *C08L 23/00* (2013.01); *C08J 9/0061* (2013.01); *C08J 2323/00* (2013.01); *C08J 2483/04* (2013.01); *C08L 2203/14* (2013.01)

(58) Field of Classification Search
CPC ..................................................... C08L 23/00
See application file for complete search history.

(56) References Cited

U.S. PATENT DOCUMENTS

| | | | |
|---|---|---|---|
| 5,574,073 A | 11/1996 | Juen et al. | |
| 5,604,288 A * | 2/1997 | Furukawa | ............ C08G 77/442 523/213 |
| 6,013,217 A | 1/2000 | Hauenstein et al. | |
| 6,767,931 B2 | 7/2004 | Martinez et al. | |
| 7,608,668 B2 | 10/2009 | Li Pi Shan et al. | |
| 7,671,106 B2 | 3/2010 | Markovich et al. | |
| 7,858,706 B2 | 12/2010 | Arriola et al. | |
| 2006/0199872 A1* | 9/2006 | Prieto | ......................... C08J 9/00 521/142 |
| 2011/0178195 A1 | 7/2011 | Cheng | |
| 2012/0138332 A1* | 6/2012 | Watanabe | .................. C08J 9/06 174/120 C |
| 2012/0322905 A1 | 12/2012 | Kusanose et al. | |
| 2013/0082215 A1* | 4/2013 | Esseghir | .................. H01B 1/22 252/514 |
| 2015/0166755 A1 | 6/2015 | Kim | |
| 2016/0160037 A1 | 6/2016 | Hanna et al. | |
| 2017/0114188 A1 | 4/2017 | Habimana | |

FOREIGN PATENT DOCUMENTS

| | | | |
|---|---|---|---|
| CN | 103709581 A | | 4/2014 |
| CN | 105670199 A | | 6/2016 |
| CN | 105885327 | | 8/2016 |
| CN | 106147109 | | 11/2016 |
| CN | 106366425 | * | 2/2017 |
| JP | 3665446 | | 6/2005 |
| KR | 1075070 | | 10/2011 |

OTHER PUBLICATIONS

PCT/CN2017/119247, International Search Report and Written Opinion with a mailing date of Sep. 29, 2018.
PCT/CN2017/119247, International Preliminary Report on Patentability with a mailing date of Jun. 30, 2020.
PCT/US2018/067664, International Search Report and Written Opinion with a mailing date of Mar. 21, 2019.
PCT/US2018/067664, International Preliminary Report on Patentability with a mailing date of Jun. 30, 2020.

* cited by examiner

*Primary Examiner* — Irina Krylova

(57) ABSTRACT

A composition comprising at least the following components: A) an olefin multi-block copolymer; and B) a silicone rubber that comprises pendant vinyl groups, and optionally comprises terminal vinyl groups.

2 Claims, 1 Drawing Sheet

OLEFIN MULTI-BLOCK COPOLYMER / SILICONE RUBBER COMPOSITIONS AND FOAMS FORMED FROM THE SAME

BACKGROUND

Olefin block copolymers (OBC) can be used to form lightweight shoe midsoles. For use as a unitsole foam, the polymer composition should have good abrasion resistance and good wet traction (high wet coefficient of friction (wet COF)). Although a polydimethyl-siloxane can be used to improve abrasion resistance, the wet COF will typically decrease, resulting in poor wet traction. Foamable compositions and/or other elastomeric compositions are described in the following references: U.S. Pat. No. 6,767,931, US2011/0178195, US2015/0166755, US2016/0160037, KR1075070B 1 (abstract), U.S. Pat. Nos. 7,671,106, 6,013,217, US2012/0322905, JP3665446B2 (abstract), CN105670199A (abstract), CN103709581B (abstract). However, there is a need for a new polymer compositions that provides good abrasion resistance and good wet COF. There is a further need for such compositions that have good mechanical properties, such as compression set, resilience and tensile strength. These needs have been met by the following invention.

SUMMARY

A composition comprising at least the following components:
A) an olefin multi-block copolymer;
B) a silicone rubber that comprises pendant vinyl groups, and optionally comprises terminal vinyl groups.

DETAILED DESCRIPTION

Figure 1:
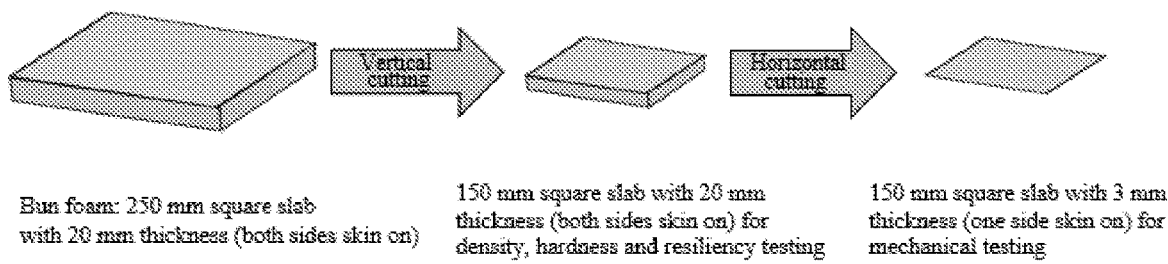
FIG. 1 depicts a schematic of different samples cut from a Bun foam.
Figure 2:
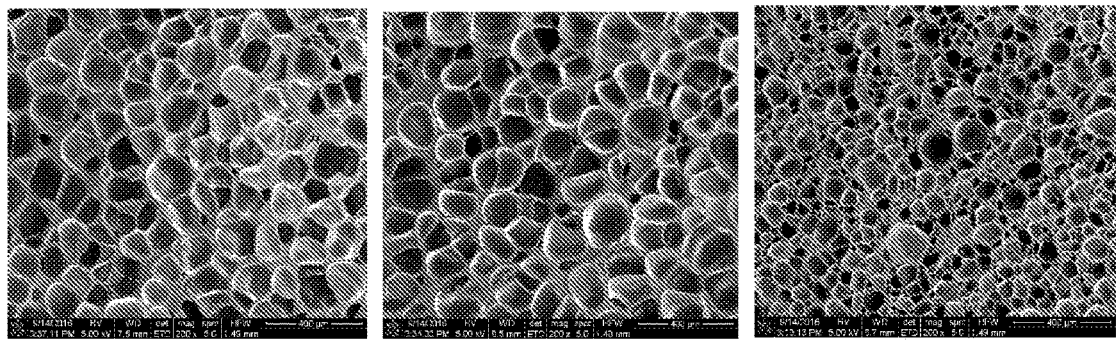
FIG. 2 depicts SEM images of Comparative Example 2 (far left), Comparative Example 3 (middle) and Inventive Example 1 (far right).

OBC/silicone rubber compositions have been discovered for unitsole foam applications. It has been discovered that these compositions provide excellent crosslinking mechanics during foaming, and result in a foam with good (low DIN) abrasion resistance, without significant decreasing the wet COF. It has also been discovered that these compositions have good mechanical properties, such as compression set, resilience and tensile strength. Also, the addition of silicone rubber can help with the processability of the composition when used in injection foaming applications.

As discussed above, provided is a composition comprising at least the following components:
A) an olefin multi-block copolymer;
B) a silicone rubber that comprises pendant vinyl groups, and optionally comprises terminal vinyl groups.

An inventive composition may comprise a combination of two or more embodiments, as described herein.

Each component of an inventive composition may comprise a combination of two or more embodiments as described herein.

In one embodiment, or a combination of two or more embodiments described herein, the silicone rubber has a weight average molecular weight (Mw)≥200,000 g/mole, or ≥250,000 g/mole, or ≥300,000 g/mole, or ≥350,000 g/mole, or ≥400,000 g/mole, or ≥450,000 g/mole, or ≥500,000 g/mole.

In one embodiment, or a combination of two or more embodiments described herein, the silicone rubber comprises one or more structures selected from i), and optionally one or more structures selected from ii) below:

i) —O—[Si(R)(CH=CH$_2$)]-[Si(R')(R")]—O—, wherein R, R' and R" are each, independently, an alkyl group, and further a C1-C6 alkyl group, and wherein R, R' and R" may all be the same alkyl group;

ii) H$_2$C=CH—[Si(R$^{IV}$)(R$^V$)]—O—, wherein R$^{IV}$ and R$^V$ are each, independently, an alkyl group, and further a C1-C6 alkyl group, and wherein R$^{IV}$ and R$^V$ may be the same alkyl group. Here, structure i) represents an internal group of a silicone rubber polymer molecule, which internal group is bonded to additional portions of the polymer molecule at each respective oxygen end group. Structure ii) represents an end group of a silicone rubber polymer molecule, which end group is bonded to an additional portion of the polymer molecule at the oxygen end group.

In one embodiment, or a combination of two or more embodiments described herein, the silicone rubber that comprises pendant vinyl groups and terminal vinyl groups.

In one embodiment, or a combination of two or more embodiments described herein, the silicone rubber comprises a structure selected from iii):

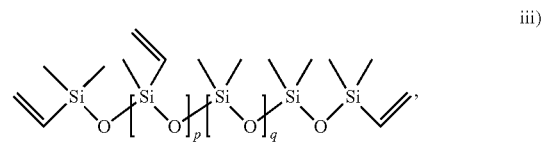

where p is from 1 to 20, and q is from 2000 to 20000. Here, structure i) shows an example of pendant vinyl groups, and terminal vinyl groups. In structure above, the pendant vinyl group can be randomly distributed throughout the polymer chain.

In one embodiment, or a combination of two or more embodiments described herein, the silicone rubber has a viscosity ≥10$^6$ cSt at 25° C.

In one embodiment, or a combination of two or more embodiments described herein, the silicone rubber has a total vinyl (CH$_2$=CH) content ≥0.10 mole %, based on the weight of the silicone rubber, and as determined by 1H NMR.

In one embodiment, or a combination of two or more embodiments described herein, the silicone rubber further comprises the following structure iv):

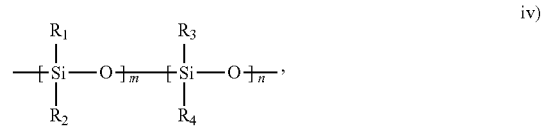

where m is from 1 to 20000, and n is from 1 to 20000; R1, R2, R3, R4 each, independently, is an alkyl, and R1, R2, R3, R4 may be the same alkyl.

The silicone rubber may comprise a combination of two or more embodiments as described herein.

In one embodiment, or a combination of two or more embodiments described herein, the olefin/alpha-olefin block copolymer has a density from 0.866 g/cc to 0.887 g/cc, or from 0.868 g/cc to 0.885 g/cc, or from 0.870 g/cc to 0.880 g/cc, or from 0.872 g/cc to 0.880 g/cc, or from 0.874 g/cc to 0.880 g/cc (1 cc=1 cm$^3$).

In one embodiment, or a combination of two or more embodiments described herein, the olefin/alpha-olefin block copolymer has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

In one embodiment, the olefin multi-block copolymer has a melt temperature (Tm) from 100° C. to 135° C., further from 110° C. to 130° C., further from 115° C. to 125° C.

In one embodiment, the olefin multi-block copolymer is an ethylene/α-olefin multi-block copolymer. In a further embodiment, the α-olefin is a C3-C8 α-olefin, and further a C4-C8 α-olefin.

The olefin multi-block copolymer may comprise a combination of two or more embodiments as described herein.

In one embodiment, or a combination of two or more embodiments described herein, the composition comprises ≥70 wt %, or ≥75 wt %, or ≥80 wt %, or ≥85 wt %, or ≥90 wt % of component A, based on weight of component A and component B.

In one embodiment, or a combination of two or more embodiments described herein, the composition comprises from 10 to 30 wt %, or from 15 to 20 wt % of component B, based on weight of component A and component B.

In one embodiment, or a combination of two or more embodiments described herein, the composition comprises ≥60 wt %, or ≥65 wt %, or ≥70 wt %, or ≥75 wt %, or ≥80 wt %, ≥85 wt %, or ≥90 wt % of component A and component B, based on weight of the composition.

In one embodiment, or a combination of two or more embodiments described herein, the composition further comprises a filler. For example, an inorganic filler (e.g., calcium carbonate, talc, silica).

In one embodiment, or a combination of two or more embodiments described herein, the composition further comprises a bromobutyl rubber.

In one embodiment, or a combination of two or more embodiments described herein, the composition further comprises an ethylene-based polymer. In a further embodiment, the ethylene-based polymer is an LDPE.

In one embodiment, or a combination of two or more embodiments described herein, the composition further comprises a crosslinking agent (for example, a peroxide or a triallyl isocyanurate).

In one embodiment, or a combination of two or more embodiments described herein, the composition further comprises a blowing agent, such as such as modified azodicarbon-amide, benzenesulfonyl hydrazide, dinitrosopentam-ethylene-tetramine, sodium bicarbonate, or ammonium carbonate.

In one embodiment, or a combination of two or more embodiments described herein, the composition comprises one or more activators of blowing agent (e.g. zinc oxide, zinc stearate).

In one embodiment, or a combination of two or more embodiments described herein, the amount of component A, present in the composition, is greater than the amount of component B, present in the composition.

In one embodiment, or a combination of two or more embodiments described herein, the composition has an abrasion DIN value ≤220 mm$^3$, or ≤210 mm$^3$, or ≤200 mm$^3$. In one embodiment, the composition has an abrasion DIN value ≤190 mm$^3$, or ≤180 mm$^3$, or ≤170 mm$^3$, or ≤160 mm$^3$, or ≤150 mm$^3$. In one embodiment, or a combination of two or more embodiments described herein, the composition has an abrasion DIN value from 120 mm$^3$ to 200 mm$^3$, or from 120 mm$^3$ to 180 mm$^3$, or 120 mm$^3$ to 160 mm$^3$.

In one embodiment, the composition has a wet COF value ≥0.500, or ≥0.510, or ≥0.520. In one embodiment, or a combination of two or more embodiments described herein, the composition has a wet COF value ≥0.530, or ≥0.540, or ≥0.550, or ≥0.560, or ≥0.570, or ≥0.580, or ≥0.590, or ≥0.600. In one embodiment, or a combination of two or more embodiments described herein, the composition has a wet COF value from 0.500 to 0.610, or from 0.520 to 0.610, or 0.530 to 0.610, or 0.540 to 0.610, or 0.550 to 0.610.

In one embodiment, or a combination of two or more embodiments described herein, the composition has a Resilience ≥66%, or ≥68%. In one embodiment, or a combination of two or more embodiments described herein, the composition has a Resilience from 65% to 70%.

In one embodiment, or a combination of two or more embodiments described herein, the composition has a Tensile Strength ≥2.50 MPa, or ≥2.60 MPa, or ≥2.70 MPa. In one embodiment, or a combination of two or more embodiments described herein, the composition has a Tensile Strength from 2.50 MPa to 3.20 MPa, or from 2.60 MPa to 3.20 MPa, or from 2.70 MPa to 3.20 MPa. 1

In one embodiment, or a combination of two or more embodiments described herein, the composition has a compression set value ≤26%, or ≤24%, or ≤22%. In one embodiment, or a combination of two or more embodiments described herein, the composition has a compression set value from 20% to 26%, or from 20% to 24%, or 20% to 22%.

In one embodiment, or a combination of two or more embodiments described herein, the composition has a Resilience>60%, a DIN<200 mm$^3$ and a wet COF>0.55.

In one embodiment, or a combination of two or more embodiments described herein, the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition. In one embodiment, or a combination of two or more embodiments described herein, the composition does not comprise a styrenic block copolymer or terpolymer (for example, an SES, SBS, SEP, etc.).

In one embodiment, or a combination of two or more embodiments described herein, the composition comprises ≤1.00 wt %, or ≤0.50 wt %, or ≤0.20 wt %, or ≤0.10 wt %, or ≤0.05 wt % of a polystyrene, based on the weight of the composition. In one embodiment, the composition does not comprise a polystyrene.

In one embodiment, the composition comprises ≤50 wt %, or ≤40 wt %, or ≤30 wt %, or ≤20 wt %, or ≤10 wt % of an EVA, based on the weight of the composition.

In one embodiment, or a combination of two or more embodiments described herein, the composition comprises ≤1.00 wt %, or ≤0.50 wt %, or ≤0.20 wt %, or ≤0.10 wt %, or ≤0.05 wt % of an EVA, based on the weight of the composition. In one embodiment, the composition does not comprise an EVA.

In one embodiment, or a combination of two or more embodiments described herein, the composition comprises ≤1.00 wt %, or ≤0.50 wt %, or ≤0.20 wt %, or ≤0.10 wt %, or ≤0.05 wt % of a polyamide, based on the weight of the composition. In one embodiment, the composition does not comprise a polyamide.

An inventive composition may comprise a combination of two or more embodiments as described herein.

Also is provided an article comprising at least one component formed from the composition of one or more compositions described herein. In a further embodiment, the article is a foam, and further a unitsole foam. In one embodiment, the foam has a density from 0.20 to 0.30 g/cc, or from 0.22 to 0.28 g/cc, or from 0.24 to 0.26 g/cc.

An article may comprise a combination of two or more embodiments as described herein.

Olefin Multi-Block Copolymer

The present composition includes an olefin multi-block copolymer or olefin block copolymer. An "olefin block copolymer" (or OBC), as used herein, is a multi-block or segmented copolymer and includes two or more chemically distinct regions or segments (referred to as "blocks") joined in a linear manner, that is, a polymer comprising chemically differentiated units, which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or $M_w/M_n$), block length distribution, and/or block number distribution due to the unique process making of the copolymers. More specifically, when produced in a continuous process, embodiments of the OBC may possess a PDI ranging from 1.7 to 8; or from 1.7 to 3.5; or from 1.7 to 2.5; or from 1.8 to 2.5; or from 1.8 to 2.1. When produced in a batch or semi-batch process, embodiments of the OBC may possess a PDI ranging from 1.0 to 2.9; or from 1.3 to 2.5; or from 1.4 to 2.0; or from 1.4 to 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol %, with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

(AB)$_n$ where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units, in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments, on the other hand, refer to blocks of polymerized units, in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI, fitting a Schulz-Flory distribution rather than a Poisson distribution. The present OBC is produced by the polymerization process described in U.S. Pat. Nos. 7,858,706 and 7,608,668, which results in a product having both a polydisperse block distribution, as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the olefin block copolymer is an ethylene/α-olefin multi-block copolymer. In a further embodiment, the ethylene/α-olefin multi-block copolymer has a density from 0.86 to 0.89 g/cc, further from 0.87 to 0.88 g/cc (1 cc=1 cm$^3$).

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2.$$

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,$$

wherein d is from 0.866 g/cc, or 0.87 g/cc to 0.89 g/cc, or 0.91 g/cc, or 0.93 g/cc, and Tm is from 113° C., or 115° C., or 117° C., or 118° C. to 120° C., or 125° C., or 130° C.

In an embodiment, the ethylene/α-olefin multi-block copolymer is defined as having (B) Mw/Mn from 1.7 to 3.5, and is characterized by a heat of fusion, ΔH in J/g, and a delta quantity, ΔT, in degrees Celsius, defined as the temperature difference between the tallest DSC peak and the tallest Crystallization Analysis Fractionation ("CRYSTAF") peak, wherein the numerical values of ΔT and ΔH have the following relationships:

ΔT>−0.1299 (ΔH)+62.81 for ΔH greater than zero and up to 130 J/g,

ΔT>48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re>1481-1629(d).$$

In an embodiment, the ethylene/α-olefin multi-block copolymer is defined as having (D) a molecular weight fraction which elutes between 40° C. and 130° C., when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and a molar comonomer content (based on the whole polymer) within 10 percent of that of the ethylene/α-olefin interpolymer.

In an embodiment, the ethylene/α-olefin multi-block copolymer is defined as having (E) a storage modulus at 25° C., G'(25° C.), and a storage modulus at 100° C., G' (100° C.), wherein the ratio of G'(25° C.) to G'(100° C.) is in the range of about 1:1 to about 9:1.

In an embodiment, the ethylene/α-olefin multi-block copolymer is defined as having (F) a molecular fraction which elutes between 40° C. and 130° C., when fractionated using TREF, characterized in that the fraction has a block index of at least 0.5, and up to about 1, and a molecular weight distribution, Mw/Mn, greater than about 1.3. In a further embodiment, the ethylene/α-olefin multi-block copolymer has a molecular weight distribution, Mw/Mn, less than, or equal to, about 3.5.

In an embodiment, the ethylene/α-olefin multi-block copolymer is defined as having (G) average block index greater than zero, and up to about 1.0, and a molecular weight distribution, Mw/Mn, greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, butene, hexene, or octene.

In an embodiment, the ethylene/α-olefin multi-block copolymer excludes styrene.

In an embodiment, the ethylene/α-olefin multi-block copolymer is an ethylene/octene multi-block copolymer. In a further embodiment, the ethylene/octene multi-block copolymer has a density from 0.86 to 0.89 g/cc (1 cc=1 cm$^3$).

In an embodiment, the soft segment of the ethylene/octene multi-block copolymer includes from 5 mol %, or 7 mol %, or 9 mol %, or 11 mol %, or 13 mol %, or 15 mol % to 18 mol % or 20 mol % units derived from octene. The ethylene/octene multi-block copolymer has a density from 0.866 g/cc to 0.887 g/cc. The ethylene/octene multi-block copolymer has a melt index (MI) from 0.5 g/10 min, or 5.0 g/10 min, or 10 g/10 min, or 15 g/10 min, to 20 g/10 min, or 25 g/10 min, or 30 g/10 min.

In an embodiment, the OBC is an ethylene/octene multi-block copolymer with one, some, or all of the following properties: a density from 0.866 g/cc to 0.880 g/cc, a melt index from 0.5 g/10 min to 10 g/10 min, and a melt temperature from 100° C. to 130° C., or from 110° C. to 125° C.

Olefin multi-block copolymers are available from The Dow Chemical Company under the name INFUSE Olefin Block Copolymers.

An olefin block copolymer may comprise a combination of two or more embodiments as described herein. An ethylene/α-olefin multi-block copolymer may comprise a combination of two or more embodiments as described herein.

Additives

The present composition may include one or more additives. Additives include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof.

In one embodiment, the composition comprises the following, based on the weight of the composition: from 50 to 95 wt % of the olefin multi-block copolymer, from 5 to 50 wt % of the silicone rubber, from 0 to 10 wt % of a bromobutyl rubber, from 0.1-10 wt % of a crosslinking agent, from 0.1 to 10 wt % of a blowing agent, from 0 to 5 wt % of one or more activators, and from 0 to 10 wt % of an inorganic filler.

Summary of Some Embodiments

1) A composition comprising at least the following components:
   A) an olefin multi-block copolymer;
   B) a silicone rubber that comprises pendant vinyl groups, and optionally comprises terminal vinyl groups.

2) The composition of 1, wherein the silicone rubber has a weight average molecular weight (Mw)≥200,000 g/mole, or ≥250,000 g/mole, or ≥300,000 g/mole, or ≥350,000 g/mole, or ≥400,000 g/mole, or ≥450,000 g/mole, or ≥500,000 g/mole.

3) The composition of 1 or 2, the silicone rubber comprises one or more structures selected from i), and optionally one or more structures selected from ii) below:
   i) —O—[Si(R)(CH═CH$_2$)]-[Si(R')(R")]—O—, wherein R, R' and R" are each, independently, an alkyl group, and further a C1-C6 alkyl group, and wherein R, R' and R" may all be the same alkyl group;

ii) $H_2C=CH-[Si(R^{IV})(R^V)]-O-$, wherein $R^{IV}$ and $R^V$ are each, independently, an alkyl group, and further a C1-C6 alkyl group, and wherein $R^{IV}$ and $R^V$ may be the same alkyl group. Here, structure i) represents an internal group of a silicone rubber polymer molecule, which internal group is bonded to additional portions of the polymer molecule at each respective oxygen end group. Structure ii) represents an end group of a silicone rubber polymer molecule, which end group is bonded to an additional portion of the polymer molecule at the oxygen end group.

4) The composition of any one of 1-3, wherein the silicone rubber that comprises pendant vinyl groups and terminal vinyl groups.

5) The composition of any one of 1-4, wherein the silicone rubber comprises a structure selected from iii):

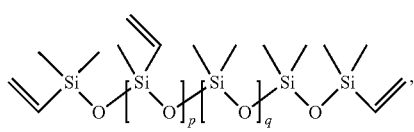

where p is from 1 to 20, and q is from 2000 to 20000. Here, structure i) shows an example of pendant vinyl groups, and terminal vinyl groups. In structure above, the pendant vinyl group can be randomly distributed throughout the polymer chain.

6) The composition of any one of 1-5, wherein the silicone rubber has a viscosity $10^6$ cSt at 25° C.

7) The composition of any one of 1-6, wherein the silicone rubber has a total vinyl ($CH_2=CH$) content ≥0.10 mole %, based on the weight of the silicone rubber, and as determined by 1H NMR.

8) The composition of any one of 1-7, wherein the silicone rubber further comprises the following structure iv):

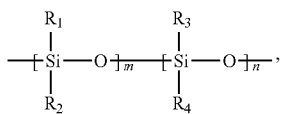

where m is from 1 to 20000, and n is from 1 to 20000; R1, R2, R3, R4 each, independently, is an alkyl, and R1, R2, R3, R4 may be the same alkyl.

9) The composition of any one of 1-8, wherein the olefin/alpha-olefin block copolymer has a density from 0.866 g/cc to 0.887 g/cc, or from 0.868 g/cc to 0.885 g/cc, or from 0.870 g/cc to 0.880 g/cc, or from 0.872 g/cc to 0.880 g/cc, or from 0.874 g/cc to 0.880 g/cc (1 cc=1 $cm^3$).

10) The composition of any one of 1-9, wherein the olefin/alpha-olefin block copolymer has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

11) The composition of any one of 1-10, wherein the olefin multi-block copolymer has a melt temperature (Tm) from 100° C. to 135° C., further from 110° C. to 130° C., further from 115° C. to 125° C.

12) The composition of any one of 1-11, wherein the olefin multi-block copolymer is an ethylene/α-olefin multi-block copolymer. In a further embodiment, the α-olefin is a C3-C8 α-olefin, and further a C4-C8 α-olefin.

13) The composition of any one of 1-12, wherein the composition comprises ≥70 wt %, or ≥75 wt %, or ≥80 wt %, or ≥85 wt %, or ≥90 wt % of component A, based on weight of component A and component B.

14) The composition of any one of 1-13, wherein the composition comprises from 10 to 30 wt %, or from 15 to 20 wt % of component B, based on weight of component A and component B.

15) The composition of any one of 1-14, wherein the composition comprises ≥60 wt %, or ≥65 wt %, or ≥70 wt %, or ≥75 wt %, or ≥80 wt %, ≥85 wt %, or ≥90 wt % of component A and component B, based on weight of the composition.

16) The composition of any one of 1-15, wherein the composition further comprises a filler. For example, an inorganic filler (e.g. calcium carbonate, talc, silica).

17) The composition of any one of 1-16, wherein the composition further comprises a bromobutyl rubber.

18) The composition of any one of 1-17, wherein the composition further comprises an ethylene-based polymer. In a further embodiment, the ethylene-based polymer is an LDPE.

19) The composition of any one of 1-18, wherein the composition further comprises a crosslinking agent (for example, a peroxide or a triallyl isocyanurate).

20) The composition of any one of 1-19, wherein the composition further comprises a blowing agent, such as such as modified azodicarbon-amide, benzenesulfonyl hydrazide, dinitrosopentamethylene-tetramine, sodium bicarbonate, or ammonium carbonate.

21) The composition of any one of 1-20, wherein the composition comprises one or more activators of blowing agent (e.g. zinc oxide, zinc stearate).

22) The composition of any one of 1-21, wherein the amount of component A, present in the composition, is greater than the amount of component B, present in the composition.

23) The composition of any one of 1-22, wherein the composition has an abrasion DIN value ≤220 $mm^3$, or ≤210 $mm^3$, or ≤200 $mm^3$. In one embodiment, the composition has an abrasion DIN value ≤190 $mm^3$, or ≤180 $mm^3$, or ≤170 $mm^3$, or ≤160 $mm^3$, or ≤150 $mm^3$.

24) The composition of any one of 1-23, wherein the composition has an abrasion DIN value from 120 $mm^3$ to 200 $mm^3$, or from 120 $mm^3$ to 180 $mm^3$, or 120 $mm^3$ to 160 $mm^3$.

25) The composition of any one of 1-24, wherein the composition has a wet COF value ≥0.500, or ≥0.510, or ≥0.520.

26) The composition of any one of 1-25, wherein the composition has a wet COF value ≥0.530, or ≥0.540, or ≥0.550, or ≥0.560, or ≥0.570, or ≥0.580, or ≥0.590, or ≥0.600.

27) The composition of any one of 1-26, wherein the composition has a wet COF value from 0.500 to 0.610, or from 0.520 to 0.610, or 0.530 to 0.610, or 0.540 to 0.610, or 0.550 to 0.610.

28) The composition of any one of 1-27, wherein the composition has a Resilience >66%, or >68%.

29) The composition of any one of 1-28, wherein the composition has a Resilience from 65% to 70%.

30) The composition of any one of 1-29, wherein the composition has a Tensile Strength ≥2.50 MPa, or ≥2.60 MPa, or ≥2.70 MPa.

31) The composition of any one of 1-30, wherein the composition has a Tensile Strength from 2.50 MPa to 3.20 MPa, or from 2.60 MPa to 3.20 MPa, or from 2.70 MPa to 3.20 MPa.

32) The composition of any one of 1-31, wherein the composition has a compression set value ≤26%, or ≤24%, or ≤22%.

33) The composition of any one of 1-32, wherein the composition has a compression set value from 20% to 26%, or from 20% to 24%, or 20% to 22%.

34) The composition of any one of 1-33, wherein the composition has a Resilience >60%, a DIN <200 mm³ and a wet COF >0.55.

35) The composition of any one of 1-34, wherein the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition.

36) The composition of any one of 1-35, wherein the composition does not comprise a styrenic block copolymer or terpolymer (for example, an SES, SBS, SEP, etc.).

37) The composition of any one of 1-36, wherein the composition comprises ≤1.00 wt %, or ≤0.50 wt %, or ≤0.20 wt %, or ≤0.10 wt %, or ≤0.05 wt % of a polystyrene, based on the weight of the composition.

38) The composition of any one of 1-37, wherein the composition does not comprise a polystyrene.

39) The composition of any one of 1-38, wherein the composition comprises ≤50 wt %, or ≤40 wt %, or ≤30 wt %, or ≤20 wt %, or ≤10 wt % of an EVA, based on the weight of the composition.

40) The composition of any one of 1-39, wherein the composition comprises ≤1.00 wt %, or ≤0.50 wt %, or ≤0.20 wt %, or ≤0.10 wt %, or ≤0.05 wt % of an EVA, based on the weight of the composition.

41) The composition of any one of 1-40, wherein the composition does not comprise an EVA.

42) The composition of any one of 1-41, wherein the composition comprises ≤1.00 wt %, or ≤0.50 wt %, or ≤0.20 wt %, or ≤0.10 wt %, or ≤0.05 wt % of a polyamide, based on the weight of the composition.

43) The composition of any one of 1-42, wherein the composition does not comprise a polyamide.

44) The composition of any one of 1-43, wherein the silicone rubber is not a liquid at room temperature (23° C.).

45) The composition of any one of 1-44, wherein the silicone rubber is a solid at room temperature (23° C.).

46) An article comprising at least one component formed from the composition of any one of 1-45.

47) The article of 46, wherein the article is a foam, and further a unitsole foam.

48) The article of 46, wherein the foam has a density from 0.20 to 0.30 g/cc, or from 0.22 to 0.28 g/cc, or from 0.24 to 0.26 g/cc.

DEFINITIONS

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer thus includes copolymers (typically employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomer.

The term, "ethylene-based polymer," as used herein, refers to a polymer that comprises a majority weight percent polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, a majority amount of ethylene monomer (based on the weight of the interpolymer), and at least one α-olefin. This term does not include the olefin block copolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. This term does not include the olefin block copolymers.

The term "propylene-based polymer," as used herein, refers to a polymer that comprises, in polymerized form, a majority amount of propylene monomer (based on the total weight of the polymer) and optionally may comprise at least one polymerized comonomer.

TEST METHODS

GPC—Silicone Rubber

The chromatographic equipment consisted of a Waters 2695 Separations Module equipped with a vacuum degasser, and a Waters 2414 refractive index detector. The separation was made with three STYRAGEL HR columns (300 mm×7.8 mm) (molecular weight separation range of 100 to 4,000,000), preceded by a STYRAGEL guard column (30 mm×4.6 mm). The analyses were performed using certified grade toluene, flowing at 1.0 mL/min as the eluent, and the columns and detector were both heated to 45° C. The sample (0.5% wt/v) was prepared by weighing approx. 0.025 g of neat sample into a 12-mL glass vial, and diluting with approx. 5 ml toluene. The sample solution was transferred to a glass autosampler vial, after filtered through 0.45 μm PTFE filter. An injection volume of 100 uL was used, and data was collected for 38 minutes. Data collection and analyses were performed using Waters Empower GPC software. Molecular weight averages were determined relative to a calibration curve (3rd order) created using polystyrene standards covering the molecular weight range of 370-1,270,000 g/mole.

$^1$H NMR—Identification of Total Vinyl Level of Silicone Products

For Silicone Rubber (For Example, RBB-2008-50 and SRB #1):

Sample (0.05 g) was dissolved in about 2.75 g CDCl3 at 50° C. in a 10 mm NMR tube. $^1$H NMR was performed on a Bruker AVANCE 400 MHz spectrometer equipped with a Bruker Dual DUL high-temperature CryoProbe and a sample temperature of 50° C. Two experiments were run to obtain spectra, a control spectrum to quantitate the total polymer protons, and a double presaturation experiment, which suppresses the intense polymer backbone peaks and enables high sensitivity spectra for quantitation of the unsaturation. The control was run with ZG pulse, 8 scans, 1.64 s, relaxation delay ($D_1$) 30 s. The double presaturation experiment was run with a modified pulse sequence, 100 scans, DS 4, AQ 1.64 s, presaturation time ($D_1$) 1 s, relaxation delay ($D_{13}$) 30 s.

For silicone Rubber Blend (For Example, SPB #2)

The test sample was prepared by adding 0.05 g of sample to 2.75 g of 50/50 by weight ortho-dichlorobenzene-d4/Perchloroethylene with 0.001 M Cr(AcAc)3 in a 10 mm NMR tube. $^1$H NMR was performed on a Bruker AVANCE 400 MHz spectrometer equipped with a Bruker Dual DUL high-temperature CryoProbe and a sample temperature of 120° C. Two experiments were run to obtain spectra, a control spectrum to quantitate the total polymer protons, and a double presaturation experiment, which suppresses the intense polymer backbone peaks and enables high sensitivity spectra for quantitation of the end-groups. The control was run with ZG pulse, 16 scans, 1.64 s, relaxation delay ($D_1$) 14 s. The double presaturation experiment was run with a modified pulse sequence, 200 scans, DS 4, AQ 1.64 s, presaturation time ($D_1$) 1 s, relaxation delay ($D_{13}$) 13 s.

$^{29}$Si NMR—Confirm the Existence of Pendant Vinyl

Approximately 0.85 g sample was dissolved in about 1.5 g CDCl$_3$, containing 0.025 M Cr(AcAc)$_3$ as a relaxation agent, at 50° C., in a 10 mm NMR tube. $^{29}$Si NMR was performed on a Bruker AVANCE III 400 MHz spectrometer, equipped with a Bruker, 10 mm PABBO probe and a sample temperature of 50° C. The spectra were run with ZGIG pulse sequence, 8000 to 10,000 scans, and a 16 s relaxation delay. The PDMS main-chain Si units were referenced at −22 ppm. Si attached to terminal vinyls were observed at −4 ppm, while Si with pendent vinyls were observed at −36 ppm.

SEM Analysis

The method for cutting the foam sample used a single edge blade to carefully cut a sample for the SEM image. The sample was coated with a conductive coating, twice, to ensure a good image quality. The sample was then put into Nova 630 SEM, and observed by ETD detector at an accelerating voltage of 5 KV detector.

Foam Density

Each Bun foam sample was weighted to the nearest 0.1 gram, and volume of the foam was determined by measuring length, width, and thickness to the nearest 0.01 cm. The density was calculated based on the weight and volume. See FIG. 1 for the sample cut from the Bun foam.

Falling Ball Rebound (Resilience)

A ⅝" diameter steel ball was dropped from a height of 500 mm onto the Bun foam slab, which was cut from the Bun foam, in the vertical direction, such that the slab had both an upper skin and a lower skin. The % Rebound was calculated as the {["rebound height (mm)"/500 (mm)] *100}.

Asker C Hardness

The hardness was an average of five readings (5 seconds latency) measured across the surface of the sample according to ASTM D2240.

Mechanical Properties

Bun foam skin and foam layers were submitted for ASTM D638 (Tensile, Type 4) and ASTM D624 (Tear, Type C) mechanical property testing, each crosshead speed at 20 inches/minute. The sample thickness was approximately 3 mm. The split tear strength was measured by using a specimen with the dimension of 6 inch (length)*1 inch (width)*0.4 inch (thickness), and a notch depth from 1 to 1.5 inch, and at the testing speed of 2 inches/minute.

DIN Abrasion Test (Rotary Drum Method):

The DIN abrasion volume loss (in mm$^3$) was measured according to ASTM D5963, with a load of 10 N, and using a rotation mode (method B, 40 rpm for drum) during this test, 40 m abrasion. For each foam formulation, a rectangular slab (skin on one surface, approx. 10 mm in thickness) was cut from a Bun foam, and this slab was die cut into discs, each with the following dimensions: diameter was 16 mm with a thickness of approx. 10 mm. The DIN abrasion volume loss was calculated according to the equation below:

$$DIN = \frac{\Delta m_t * 200 \text{ mg}}{\rho_t * \Delta m_s}$$

where:
DIN: abrasion loss in mm$^3$,
$\Delta m_t$: weight loss of the tested specimen in mg
$\rho_t$: density of the tested specimen in mg/mm$^3$,
$\Delta m_s$: weight loss of the standard rubber in mg.
An average value was reported based, on three test samples.

Wet COF

The wet COF was measured according to ASTM D1894 (see FIG. 1a), with a load of 2.7 kg and a pulling speed of 100 mm/min, for a pull distance of 230 mm. In this test, the ground glass (plane) was used as the substrate, and deionized water was uniformly spread on the glass surface to form a thin water film. For each foam formulation, a rectangular slab (skin on one surface, approx. 7 mm in thickness) was cut from a Bun foam, and this slab was die cut into discs, each with the following dimensions: diameter approx. 12.7 mm, thickness approx. 7 mm). The disc was fastened to the sled with double sided tape, with the skin surface exposed, and in contact with glass plane. The maximum force Fm (kgf) during the pull distance was recorded, and the wet COF was calculated as (Fm)/(2.7 kgf), and the average wet COF of three test samples was recorded.

Density—Polymer Samples

Polymer samples were prepared according to ASTM D 1928. Measurements were made within one hour of sample pressing using ASTM D792, Method B.

Melt Index

Melt index (or 12, 12 or MI) for an ethylene-based polymer, or an OBC, or an inventive composition, was measured in accordance with ASTM D 1238, Condition 190° C./2.16 kg, and is reported in grams eluted per 10 minutes.

DSC Standard Method

Differential Scanning calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak $T_c$).

Compression Set

Compression set was measured according to ASTM D395 at 50° C. For each foam formulation, a rectangular slab (skin on one surface, approx. 19.5 mm in thickness) was cut from a Bun foam, and this slab was die cut into discs (button samples), each with the following dimensions: 29 mm (±0.5 mm) in diameter, and approx. 19.5 mm (±0.5 mm) thickness. Each button sample was inspected for notches, uneven thickness and inhomogeneity, and selected buttons (without those defects) were tested. Compression set was performed on two specimens for each sample, at the temperatures specified, and the average results of the two specimens was reported. The button sample was placed in the compression device having two metal plates that could be pressed together, and locked into place at 50% of the original height of the button sample. The compression device, with the compressed samples, was then placed in an oven, and equilibrated at the appropriate temperature for a specified time (6 hrs at 50° C.). In this test, the stress was released at the test temperature, and the thickness of the sample was measured after a 30 minute equilibration period at room temperature. Compression set is a measured of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Expansion Ratio

The expansion ratio was calculated on the Bun Foam, via the equation below:

$$ER = L_1/L_0$$

Where the $L_0$ is the length of the mold and $L_1$ is the length of the Bun foam after stabilization at room temperature (overnight).

Some embodiments of the present disclosure will now be described in detail in the following examples.

EXPERIMENTAL

Materials

INFUSE 9100: olefin block copolymer (ethylene/octene multi-block copolymer), density 0.877 g/cm$^3$ (ASTM D792), MI 1.0 g/10 min (ASTM D1238, at 190° C./2.16 kg), Shore A=75 (ASTM D2240).

TAISOX 7360M: ethylene-vinyl acetate copolymer, density 0.941 g/cm$^3$ (ASTM D792), MI 2.5 g/10 min (ASTM D1238, a 190° C./2.16 kg), Shore A=86 (ASTM D2240), 21 wt % VA content, based on weight of the copolymer.

ELVAX 265: ethylene-vinyl acetate copolymer, density 0.951 g/cm$^3$ (ASTM D792), MI 3.0 g/10 min (ASTM D1238, at 190° C./2.16 kg), Shore A=83 (ASTM D2240), 28 wt % VA content, based on weight of the copolymer.

ELVAX 40L-03: ethylene-vinyl acetate copolymer, density 0.967 g/cm$^3$ (ASTM D792), MI 3.0 g/10 min (ASTM D1238, at 190° C./2.16 kg), Shore A=65 (ASTM D2240), 40 wt % VA content, based on weight of the copolymer.

RBB 2008-50: silicone rubber—meets features of component B of claim 1.

SRB #1: silicone rubber base #1; Mw approx. 100000 g/mol; only terminal vinyl on PDMS, 29.7 wt % silica content, based on weight of the silicone rubber; 0.3 mole % vinyl (1H NMR) content, based on weight of the silicone rubber. Vinyl groups can be identified by 1H NMR. $^{29}$Si NMR is used to confirm the existence of, and quantitate the level of, pendant vinyl.

SPB #2: silicone rubber blend #2, an ultra-high molecular weight siloxane polymer (silicon rubber) dispersed in low density polyethylene (LDPE); the siloxane polymer level is 50 wt %, based on the weight of the blend.

BIIR 2030: bromobutyl rubber; density 0.93 g/cm$^3$ (ASTM D792); 32 MU Mooney at temp.=125° C.; 1.8 wt % bromine content, based on weight of the rubber.

LUPEROX DC40P: dicumyl peroxide (DCP) from Arkema with active peroxide content of around 40 wt %.

LUPEROX DC40P-SP2: scorch protected DCP from Arkema with active peroxide content of around 40 wt %.

AC9000: Azodicarbonamide type blowing agent. ZnO: Zinc oxide. ZnSt: Zinc Stearate. ATOMITE: Calcium carbonate.

A. Formulations

Formulations (compositions) are shown in Table 1.

TABLE 1

| | Formulations | | | | | | |
|---|---|---|---|---|---|---|---|
| | CE-1 Comp. | CE-2 Comp. | CE-3 Comp. | CE-4 Comp. | CE-5 Comp. | IE-1 Inv. | IE-2 Inv. |
| INFUSE 9100 | 100 | 100 | 100 | | 80 | 80 | 76 |
| RBB 2008-50 | | | | 20 | | 20 | 19 |
| SRB#1 | | | | | 20 | | |
| EVA* | | | | 80 | | | |
| BIIR 2030 | | | | | | | 5 |
| SPB#2 | | 3 | 5 | | | | |
| DC40P | 1.2 | 1.2 | 1.2 | 1.35 | 1.2 | 1.2 | 1.2 |
| DC40P-SP2 | 0.8 | 0.8 | 0.8 | 0.9 | 0.8 | 0.8 | 0.8 |
| AC9000 | 2.2 | 2.1 | 2.1 | 1.9 | 2.5 | 2.5 | 2.8 |
| ZnO | 0.22 | 0.21 | 0.21 | 0.19 | 0.25 | 0.25 | 0.28 |

TABLE 1-continued

| | CE-1 Comp. | CE-2 Comp. | CE-3 Comp. | CE-4 Comp. | CE-5 Comp. | IE-1 Inv. | IE-2 Inv. |
|---|---|---|---|---|---|---|---|
| | | | Formulations | | | | |
| ZnSt | 0.22 | 0.21 | 0.21 | 0.19 | 0.25 | 0.25 | 0.28 |
| CaCO3 | 5 | 5 | 5 | 5 | 5 | 5 | 5 |

EVA*: EVA 7360M/EVA 265/EVA 40L-03 (30/30/40, wt/wt/wt)

Formulation Preparation and Sample Preparation

Each formulation, listed in the Table 1, was prepared by using the same method. Taking CE-1 formulation, as an example, the polymer(s) (here, only INFUSE 9100 (914 grams)) was/were added to a "1.5 liter" BANBURY mixer. Then, ZnO, ZnSt and CaCO3 were added, after the polymer component(s) had melted (around 5 minutes at 120° C.). The blowing agent and peroxide were added last, and mixed for another 3 to 5 minutes at around 120° C. (temperature does not exceed over 130° C.) for a total mixing time of 15 minutes, to form a mixed formulation.

The mixed formulation was added to a two-roll mill, to form a roll milled blanket (approx. 5 mm thickness). The blanket was cut into squares. Several squares, weighing 420 grams in total, were placed inside a pre-heated Bun foam mold (7 in×7 in×0.5 inch). The preheating was conducted for 9 minutes at 120° C. (no pressure), and for 4 minutes at 120° C. and an applied force of 10 tons. The preheated sample was transferred to a foaming press, and held for 10 minutes at 180° C. and at an applied force of 4 tons (pressure of 100 kg/cm$^2$). Once the pressure was released, the Bun foam released quickly from the tray, and was placed in a vent hood on several non-stick sheets. The Bun foam was allowed to cool overnight, and then cut into slices for testing.

The Bun foams were trimmed into "6 inch×6 inch" plaques, using a vertical band saw. Density, Hardness and Resilience of the form trimmed slabs (with skin on two surfaces) were measured. Thin slices were then cut from the trimmed slabs into required thickness (around 3 mm in thickness) using a lab scale horizontal band saw. The slices (some contain a skin layer, and some do not contain a skin layer) were used to measure the tensile strength and tear properties. Generally, the remaining middle foam layer of the trimmed Bun foam was used to measure shrinkage resistance of the foam. Other parts of the Bun foam were cut into slices with different thickness for specific tests; e.g., 7 mm thickness for the wet COF test, 10 mm thickness for DIN abrasion test, 10 mm thickness for split tear test, and 19.5 mm thickness for compression set test.

B. Results and Discussion

Table 2 below lists the foam (unitsole) properties of the inventive examples and the comparative examples, including expansion ratio, foam density with skin, hardness, mechanical properties, DIN abrasion and wet COF.

TABLE 2

Properties of comparative and inventive examples (with skin)

| | Unit | CE-1 | CE-2 | CE-3 | CE-4 | CE-5 | IE-1 | 1E-2 |
|---|---|---|---|---|---|---|---|---|
| Expansion ratio* | | 1.51 | 1.50 | 1.50 | 1.50 | 1.47 | 1.50 | 1.50 |
| Density* | g/cm$^3$ | 0.23 | 0.24 | 0.23 | 0.25 | 0.26 | 0.25 | 0.25 |
| Hardness* | Asker C | 53.4 | 52.8 | 53.0 | 47.2 | 53.2 | 53.0 | 50.2 |
| Resilience* | % | 68.0 | 67.2 | 68.0 | 58.0 | 68.0 | 70.4 | 69 |
| Tensile Strength** | MPa | 2.48 ± 0.07 | 2.21 ± 0.07 | 2.26 ± 0.08 | 3.43 ± 0.16 | 3.00 ± 0.01 | 3.08 ± 0.13 | 2.73 ± 0.08 |
| Elongation** | % | 329 ± 1 | 334 ± 4 | 347 ± 10 | 363 ± 4 | 322 ± 11 | 332 ± 24 | 316 ± 33 |
| Tear** | N/mm | 12.61 ± 0.07 | 13.48 ± 0.77 | 12.66 ± 0.48 | 12.01 ± 0.72 | 13.59 ± 0.13 | 13.02 ± 0.27 | 12.76 ± 0.02 |
| C-set** | % | 30.0 | 23.9 | 22.2 | 50.6 | 21.4 | 21.6 | 21.0 |
| Abrasion, DIN** | mm$^3$ | 658 ± 19 | 213 ± 14 | 129 ± 12 | 217 ± 18 | 156 ± 12 | 140 ± 11 | 180 ± 15 |
| Wet COF** | | 0.612 ± 0.01 | 0.554 ± 0.01 | 0.489 ± 0.01 | 0.527 ± 0.004 | 0.343 ± 0.01 | 0.552 ± 0.01 | 0.600 ± 0.01 |

*Two skin surfaces (entire slab).
**One skin surface or the skin sample.

SEM morphology of Comparative Examples 2 and 3 and Inventive Example 1 with same magnification were shown in below FIG. 1. It has been discovered that the foam (unitsole foam) formed from Inventive Example 1 provides much smaller pore cell size than the foams formed from Comparative Examples 2 and 3, respectively, and this much smaller pore cell size provides for improved tensile strength.

For Comparative Example 1 and Comparative Examples 2 and 3, the abrasion resistance could be improved (lowered) by adding the conventional PDMS, while the wet COF was significantly decreased. However, by comparison of Inventive Example 1 and Comparative Example 2, we can find that under similar foam hardness and wet COF, foam formed from Inventive Example 1 provided better (lower) abrasion resistance than the foam formed from Comparative Examples 2. Also, by comparison of Inventive Example 1 and Comparative Example 3, it was discovered that for similar foam hardness and abrasion resistance, the foam formed from Inventive Example 1 provided higher wet COF than that of the foam formed from Comparative Examples 3. Thus, Inventive Example 1 provided a better balance of abrasion and traction than Comparative Examples 2 and 3. In addition, higher resiliency and higher tensile strength are obtained in the foam (unitsole foam) formed from the inventive example.

By comparison of Inventive Example 1 and Comparative Example 4, it has been discovered that under similar expansion ratios and foam densities, the foam (unitsole foam) formed from Inventive Example 1 provided better abrasion resistance (lower value), better wet traction (higher wet COF), lower C-set and higher resilience than that of the foam formed from Comparative Example 4 (EVA/silicone rubber).

By comparison of Inventive Example 1 and Comparative Example 5, it has been discovered that under similar foam hardness and foam densities, the foam formed from Inventive Example 1 (with the higher molecule weight silicone rubber) provided a higher wet COF value and a higher resilience, while maintaining a better (lower) abrasion resistance.

By comparison of Inventive Example 1 and Comparative Examples 3 and 5, it has been discovered that both high molecule weight and pendant vinyl groups (or high vinyl content) are required in the molecule structure of silicone rubber to achieve a higher wet COF value. By comparison of Inventive Example 1 and Inventive Example 2, it has been discovered that the bromobutyl rubber (BIIR 2030) can be used efficiently increase the COF of OBC/silicone rubber unitsole foam.

It has also been discovered that silicone rubber with high molecule weight (≥200,000 g/mole) and pendant vinyl group (vinyl content≥0.04 wt %) provides better (lower) abrasion resistance, while providing high wet COF value. In addition, higher resiliency and higher tensile strength can be obtained from the inventive compositions. Under similar expansion ratios and foam densities, unitsole foams based on such OBC/silicone rubber composition provides better (lower) abrasion resistance, better wet traction (higher COF), and higher resilience than that of the EVA/silicone rubber composition. Incorporation of bromobutyl rubber (BIIR) can efficiently increase the wet COF of the inventive OBC/silicone rubber composition.

What is claimed is:
1. A foamed article formed from the composition comprising the following components:
A) from 80 to 90 wt % of an olefin multi-block copolymer, wherein the olefin multi-block copolymer is an ethylene/α-olefin multi-block copolymer having a density from 0.866 g/cc to 0.877 g/cc and a melt index (I2) from 0.5 to 1.0 g/10 min (190° C. and 2.16 kg);
B) from 10 to 20 wt % of a silicone rubber having a weight average molecular weight (Mw) ≥500,000 g/mole, a viscosity of equal to or more than $10^6$ cSt at 25° C. and a total vinyl content ≥0.10 mole %, based on the weight of the silicone rubber, and as determined by 1H NMR, the silicone rubber comprising of structure iii):

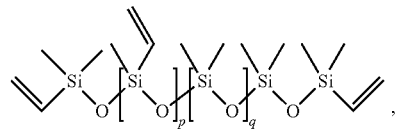

where p is from 1 to 20, and q is from 2000 to 20000;
C) from 0.1 to 2 wt % of a crosslinking agent;
D) from 2.5-2.8 wt % of a blowing agent; and
E) from 0 to 5 wt % of one or more activators;
wherein the foamed article has a foam density from 0.25 to 0.30 g/cc, an abrasion DIN value of 140-190 $mm^3$, Resilience of 69-70% and a wet COF value from 0.550 to 0.610.
2. The foamed article of claim 1, wherein the olefin multi-block copolymer has a melt temperature Tm from 100° C. to 135° C.

* * * * *